United States Patent [19]

Henderson et al.

[11] Patent Number: 4,506,031
[45] Date of Patent: Mar. 19, 1985

[54] MICROENCAPSULATED AQUEOUS POLYMERIZATION CATALYST

[75] Inventors: James N. Henderson, Hudson; Ken W. Donbar; John J. Barbour, both of Akron; Anthony J. Bell, Stow, all of Ohio

[73] Assignee: The Goodyear Tire & Rubber Company, Akron, Ohio

[21] Appl. No.: 571,756

[22] Filed: Jan. 18, 1984

Related U.S. Application Data

[62] Division of Ser. No. 419,261, Sep. 17, 1982, Pat. No. 4,429,085.

[51] Int. Cl.$^3$ .............................................. C08F 4/26
[52] U.S. Cl. .................................... 502/162; 502/167; 502/170; 502/171
[58] Field of Search ............... 502/162, 167, 170, 171; 526/92; 524/801

[56] References Cited

U.S. PATENT DOCUMENTS 4,303,769 12/1981 Odar ...................................... 526/92

Primary Examiner—Paul R. Michl
Attorney, Agent, or Firm—Alvin T. Rockhill

[57] ABSTRACT

The present invention discloses an aqueous polymerization medium comprising (1) a catalyst composition which contains (a) an organometallic compound and (b) a transition metal compound wherein said catalyst composition is microencapsulated in a polyene product; and (2) water. This invention also discloses an aqueous polymerization medium comprising (1) a catalyst composition which is prepared by dissolving in an inert organic solvent containing at least one polyene (a) a transition metal compound, and (b) an organometallic compound; and (2) water. This aqueous polymerization medium is very useful in the polymerization of unsaturated hydrocarbon monomers. It is of greatest value in the polymerization of conjugated diolefin monomers into stereoregulated polymers. This invention reveals a very useful process for producing polybutadiene composed essentially of syndiotactic 1,2-polybutadiene in an aqueous medium comprising polymerizing 1,3-butadiene in said aqueous medium in the presence of (1) a catalyst composition microencapsulated in a polyene product which contains (a) at least one cobalt compound selected from the group consisting of (i) $\beta$-diketone complexes of cobalt, (ii) $\beta$-keto acid ester complexes of cobalt, (iii) cobalt salts of organic carboxylic acids having 6 to 15 carbon atoms, and (iv) complexes of halogenated cobalt compounds of the formula $CoX_n$, wherein X represents a halogen atom and n represents 2 or 3, with an organic compound selected from the group consisting of tertiary amine alcohols, tertiary phosphines, ketones and N,N-dialkylamides, and (b) at least one organoaluminum compound of the formula $AlR_3$, wherein R represents a hydrocarbon radical of 1 to 6 carbon atoms; and (2) carbon disulfide.

17 Claims, No Drawings

MICROENCAPSULATED AQUEOUS POLYMERIZATION CATALYST

This is a divisional of application Ser. No. 419,261, filed Sept. 17, 1982, now issued as U.S. Pat. No. 4,429,085.

BACKGROUND OF THE INVENTION

The present invention discloses an aqueous polymerization medium comprising (1) a catalyst composition which contains (a) an organometallic compound and (b) a transition metal compound wherein said catalyst composition is microencapsulated in a polyene product; and (2) water. This invention also discloses an aqueous polymerization medium comprising (1) a catalyst composition which is prepared by dissolving in an inert organic solvent containing at least one polyene (a) a transition metal compound and (b) an organometallic compound and (2) water. This aqueous polymerization medium is very useful in the polymerization of unsaturated hydrocarbon monomers. It is of greatest value in the polymerization of conjugated diolefin monomers into stereo-regulated polymers. This invention reveals a very useful process for producing a polybutadiene composed essentially of syndiotactic 1,2-polybutadiene in an aqueous medium comprising polymerizing 1,3-butadiene in said aqueous medium in the presence of (1) a catalyst component microencapsulated in a polyene product which contains (a) at least one cobalt compound selected from the group consisting of (i) β-diketone complexes of cobalt, (ii) β-keto acid ester complexes of cobalt, (iii) cobalt salts of organic carboxylic acids having 6 to 15 carbon atoms, and (iv) complexes of halogenated cobalt compounds of the formula $CoX_n$, wherein X represents a halogen atom and n represents 2 or 3, with an organic compound selected from the group consisting of tertiary amine alcohols, tertiary phosphines, ketones and N,N-dialkylamides, and (b) at least one organoaluminum compound of the formula $AlR_3$ wherein R represents a hydrocarbon radical of 1 to 6 carbon atoms; and (2) carbon disulfide.

The syndiotactic 1,2-polybutadiene produced in accordance with this invention is valuable as the material of films, fibers, and many other shaped products, because of its unique properties such as high melting point, high crystallinity and excellent solvent resistance. Furthermore, this syndiotactic 1,2-polybutadiene exhibits excellent mechanical properties, particularly impact strength, when crystallinity and melting points are moderated.

The polybutadiene produced by the subject process possesses vinyl radical side chains, and consequently shows remarkably improved surface characteristics over those of polyolefin resins. Syndiotactic 1,2-polybutadiene has a unique combination of properties which make it very useful in tires. For example, both wear and rolling resistance are improved by the inclusion of this polymer in tires.

The vinyl radical side chains present in this syndiotactic 1,2-polybutadiene also conveniently allow for the post-treatment of the polymer, such as, crosslinking, graft-polymerization, etc.

Methods for making this polymer by polymerization in hydrocarbons or halogenated hydrocarbon solvents are well-known.

A process for the preparation of 1,2-polybutadiene which comprises polymerizing 1,3-butadiene in the liquid phase, in the presence of a catalyst composition composed of:
  (a) a cobalt compound
  (b) an organoaluminum compound of the formula $AlR_3$ in which R is a hydrocarbon radical of 1–6 carbons, and
  (c) carbon disulfide is disclosed in U.S. Pat. No. 3,778,424, which is herein incorporated by reference in its entirety. U.S. Pat. No. 3,901,868 reveals a process for producing a butadiene polymer consisting essentially of syndiotactic 1,2-polybutadiene by the successive steps of:

(a) preparing a catalyst component solution by dissolving, in an inert organic solvent containing 1,3-butadiene, a cobalt compound, soluble in the organic solvent, such as (i) cobalt-β-diketone complex, (ii) cobalt-β-keto acid ester complex, (iii) cobalt salt of organic carboxylic acid, and (iv) halogenated cobalt-ligand compound complex, and an organoaluminum compound, (b) preparing a catalyst composition by mixing the catalyst component solution with an alcohol, ketone or aldehyde compound and carbon disulfide, (c) providing a polymerization mixture containing desired amounts of 1,3-butadiene, the catalyst composition and an inert organic solvent, and (d) polymerizing 1,3-butadiene at a temperature of −20° C. to 90° C. This patent is herein incorporated by reference in its entirety.

U.S. Pat. No. 3,778,424 indicates that the presence of water in the catalyst and/or the polymerization system reduces the polymer yield. U.S. Pat. No. 3,901,868 indicates that it is well-known that the organoaluminum catalyst component should be prevented from contact with water.

One aqueous polymerization of a stereo-regulated polymer of commercial significance should be noted. Polychloroprene is made in an aqueous emulsion with a free radical generating catalyst. This polymer has more than 95 percent of its monomer units in a 1,4-configuration (mostly trans). This structural purity is probably caused by steric and electronic effects in the polymerizing chlorinated hydrocarbon monomers, but in any case is quite untypical of a polymer prepared in a free radical polymerization. Some other exceptions to the general rule that stereo regulated polymers can only be prepared in a nonaqueous medium include the preparation of crystalline trans 1,4-polybutadiene which has been synthesized in an aqueous medium employing certain metal salts, such as those of rhodium and ruthenium as the catalyst, and the preparation of trans polyisoprene has also been synthesized in water employing a π-allyl nickel catalyst. 1,2-polybutadiene has been prepared in water using palladium salts as the catalyst. Low yields and other practical problems have discouraged the large scale use of these aqueous polymerizations commercially.

Obviously, the synthesis of stereo-regulated polymers in an aqueous suspension has important advantages over solution polymerization. Water as a medium in which to carry out such a polymerization is less expensive, more easily purified, less sensitive to oxygen, and has a higher heat capacity. Such an aqueous process can be carried out in emulsion-type reactors with little or no reactor modification. The aqueous process also permits higher monomer and higher solids concentrations in the reactor because of the lower viscosity of a polymer suspension compared with a polymer solution.

Unfortunately, it has been the general rule that synthetic stereo regulated polymers can only be synthesized in solution processes. Aqueous processes have not been available in which there was an organometallic catalyst component present.

SUMMARY OF THE INVENTION

Since water can decompose the organoaluminum catalyst component used in the polymerization of syndiotactic 1,2-polybutadiene, it has been believed that the removal of essentially all of the water from such a polymerization system was desirable. The present invention reveals a technique for "protecting" such as organoaluminum catalyst component from water which even allows for carrying out aqueous suspension polymerizations in a water medium.

This invention is useful in the polymerization of unsaturated hydrocarbon monomers to polymers. It is particularly useful in the synthesis of stereo regulated polymers from conjugated diolefin monomers. Stereo regulated hydrocarbon polymers can be synthesized in an aqueous medium in the presence of a catalyst composition comprising (1) an organometallic and (2) a transition metal compound which is microencapsulated in a polyene product. Some representative examples of conjugated diolefins that conceivably can be polymerized into stereo regulated polymers include isoprene, piperylene, butadiene, and the like. The transition metal compounds that can be employed in the catalyst composition include: $\beta$-diketone complexes of cobalt; $\beta$-keto acid ester complexes of cobalt; cobalt solids of organic carboxylic acids; complexes of halogenated cobalt compounds of the formula $CoX_n$, wherein X represents a halogen atom and n represents 2 or 3, with an organic compound; and the like. The organometallic compounds that can be employed in the catalyst composition include: organoaluminum compounds of the formula: $AlR_3$; organolithium compounds of the formula: LiR; organomagnesium compounds of the formula: $MgR_2$ and the like. The preferred organometallic compounds are the organoaluminum compounds of the formula: $AlR_3$ and the organolithium compounds of the formula: LiR.

These catalyst components are microencapsulated in at least one polyene product in order to protect the catalyst from the water used as the medium in these polymerizations. It is believed that a hydrophobic shield is formed around the catalyst that the water cannot readily penetrate. However, this hydrophobic shield or membrane is probably permeable by the monomer being polymerized. The polyene product formed, that microencapsulates the catalyst, is believed to be either a monomeric complex, an oligomer of the polyene, or a polymer of the polyene. This polyene product can be formed from the same monomer that is being polymerized into a polymer in the main polymerization or from a different polyene that is not being used in the main polymerization of this invention. Polyenes are olefins that contain 2 or more double bonds. A probable explanation of the effectiveness of microencapsulation or hydrophobic shielding of the catalyst is that the polyene product comprises part of the ligand assemblage around the transition metal atom or atoms. The polyene may be bound to the metal, for example, by $\pi$-allyl bonding which is inert to water because of both steric and chemical effects of the ligand assemblage. The bond between metal and polyene, however, is readily replaced by a new $\pi$-allyl bond between metal and incoming monomer molecule, which at the same time forms a sigma bond to the diplaced polyene. Then another molecule moves into repeat this insertion process. Continuation of the process builds up a polymer molecule.

The catalyst compositions used in this invention are microencapsulated by employing a prereaction process. In this prereaction process the organometallic component and the transition metal compound component of the catalyst composition are dissolved in an inert organic solvent with at least one polyene monomer. The ratio of the monomer to the transition metal compound in this catalyst component solution should be at least 1.0 and preferably about 25 by mole. This catalyst component solution is preferably prepared at a temperature of 10° C. to 50° C. and preferably contains 0.0005 to 1.0 percent by mole, more preferably 0.001 to 0.5 percent by mole of the transition metal compound and 0.001 to 10 percent by mole and more preferably, 0.03 to 5 percent by mole of the organometallic compound based on the amount by mole of monomer that will be polymerized in the main polymerization of this invention. Such a catalyst component solution can be added to water to form an aqueous polymerization medium that is useful in the polymerization of monomers to polymers.

This invention discloses how a microencapsulated catalyst is able to produce polymer while dispersed in water. For a given organometallic/transition metal catalyst to be effective for polymerization in the presence of water, the water-sensitive catalyst components must be chosen and assembled in such a way that the catalyst is encapsulated or shielded from water and yet accessible to monomer. More particularly, catalysts are described in this invention which are shielded from water and accessible to butadiene monomer so that crystalline syndiotactic 1,2-polybutadiene is produced in high yield.

POLYBUTADIENE SYNTHESIS PROCESS

The catalyst compositions of this invention which are microencapsulated in a polyene product are of greatest value in the aqueous polymerization of butadiene monomer into polybutadiene which is composed essentially of syndiotactic 1,2-polybutadiene. This invention discloses a process for producing polybutadiene composed essentially of syndiotactic 1,2-polybutadiene, comprising the steps of:

(A) preparing a catalyst component solution by dissolving, in an inert organic solvent containing 1,3-butadiene (a) at least one cobalt compound selected from the group consisting of (i) $\beta$-diketone complexes of cobalt, (ii) $\beta$-keto acid ester complexes of cobalt, (iii) cobalt salts of organic carboxylic acids having 6 to 15 carbon atoms, and (iv) complexes of halogenated cobalt compounds of the formula $CoX_n$, wherein X represents a halogen atom and n represents 2 or 3, with an organic compound selected from the group consisting of tertiary amine alcohols, tertiary phosphines, ketones, and N,N-dialkylamides, and (b) at least one organoaluminum compound of the formula $AlR_3$, wherein R represents a hydrocarbon radical of 1 to 6 carbon atoms;

(B) preparing a reaction mixture by mixing said catalyst component solution with a 1,3-butadiene/water mixture containing desired amounts of said 1,3-butadiene;

(C) preparing a polymerization mixture by mixing carbon disulfide throughout said reaction mixture, and (D) polymerizing said 1,3-butadiene in said polymerization mixture into polybutadiene while agitating said polymerization mixture.

The polymer produced by the process of the present invention is composed essentially of syndiotactic 1,2-polybutadiene and generally has a melting point of B 70° C. to 210° C. The crystallinity and melting point of the polybutadiene produced by using this process can be controlled by adding hydrocarbon-soluble alcohols, ketones, nitriles, aldehydes or amides to the polymerization mixture.

In the first step of this synthesis of syndiotactic 1,2-polybutadiene, a catalyst component solution is prepared by dissolving at least one cobalt compound and at least one organoaluminum compound in an inert organic solvent containing at least one polyene monomer dissolved therein.

The term "an inert organic solvent" used herein refers to an organic solvent chemically inert to all of the catalyst components used in the process of the present invention, 1,3-butadiene and the butadiene polymer. Some representative examples of inert organic solvents include aromatic hydrocarbons, aliphatic hydrocarbons, alicyclic hydrocarbons, halogenated aromatic hydrocarbons, and mixtures of two or more of the above-mentioned compounds. The aromatic hydrocarbons may be benzene, toluene, xylenes, ethylbenzene, diethylbenzene or isobutylbenzene; and the aliphatic hydrocarbons may be n-hexane, isohexanes, n-heptane, n-octane, isooctanes, n-decane, 2,2-dimethylbutane, petroleum ether, kerosene, petroleum spirit or petroleum naphtha, and the alicyclic hydrocarbon may be either cyclohexane or methylcyclohexane. The halogenated aromatic hydrocarbon may be chlorobenzene, dichlorobenzenes or trichlorobenzenes.

The cobalt compound usable for the process of the present invention is soluble in an inert organic solvent selected from the group consisting of
 i. β-diketone complexes of cobalt;
 ii. β-keto acid ester complexes of cobalt;
 iii. cobalt salts of organic carboxylic acid having 1 to 25 carbon atoms, and
 iv. complexes of halogenated cobalt compounds of the formula: $CoX_n$
wherein X represents a halogen atom and n represents 2 or 3, with an organic compound selected from the group consisting of tertiary amines, alcohols, tertiary phosphines, ketones and N,N-dialkylamides.

The β-diketone compound to form a complex with a cobalt atom is of the formula:

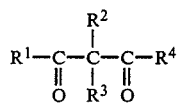

wherein $R^1$ and $R^4$, which are the same as or different from one another, are an alkyl radical of 1 to 6 carbon atoms and $R^2$ and $R^3$, which are the same as or different from one another, are a hydrogen atom or an alkyl radical having 1 to 6 carbon atoms. This type of β-diketone complex of cobalt may be cobalt (II) acetylacetonate or cobalt (III) acetylacetonate.

The β-keto acid ester to form a complex with a cobalt atom may be of the formula:

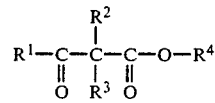

wherein $R^1$, $R^2$, $R^3$ and $R^4$ are the same as defined above. This type of cobalt complex may be a cobalt-acetoacetic acid ethyl ester complex.

The cobalt salt of organic carboxylic acid may be either cobalt octoate or cobalt naphthenate.

In the ligand compounds capable of forming a complex with a halogenated cobalt compound, the tertiary amine may be pyridine, triethylamine, tributylamine or dimethylaniline, the alcohol may be methyl alcohol or ethyl alcohol, the tertiary phosphine may be trimethyl phosphine, tributyl phosphine or triphenyl phosphine, the ketone may be acetone or methyl ethyl ketone and the N,N-dialkylamide may be N,N-dimethylformamide, N,N-dimethylacetamide, N,N-diethylformamide or N,N-diethylacetamide. The complex of halogenated cobalt is preferably either a complex of cobalt chloride with pyridine or ethyl alcohol.

The organoaluminum compound usable for the process of the present invention is of the formula $AlR_3$ wherein R represents a hydrocarbon radical of 1 to 6 carbon atoms. They hydrocarbon radical may be an alkyl, cycloalkyl or aryl radical of 1 to 6 carbon atoms. Preferably, the organoaluminum compound may be trimethylaluminum, triethylaluminum or triphenylaluminum.

In the preparation of the catalyst component solution, it is important that the cobalt compound and the organoaluminum compound are dissolved in the inert organic solvent containing at least one polyene. Some polyenes that can be used in the formation of the polyene products used to prepare microencapsulated catalysts are 1,3-butadiene, 1,3-pentadiene, isoprene, myrcene, and 1,5-cyclooctadiene. Polyenes in which at least two of the double bonds are conjugated and which have minimal substitution on the double bonds are preferred, particularly 1,3-butadiene. Other olefins which can be used are those which are capable of serving as chelating agents for transition metals, such as 1,5-cyclooctadiene. Polyenes with neither conjugation nor good chelating potential are much less effective. If the preparation is carried out in the absence of a polyene, the resultant catalyst component solution is not effective as a componenent of the catalyst composition of the present invention. The polyene is preferably used in a ratio by mole of at least 1.0, more preferably, at least 5.0 to the amount by mole of the cobalt compound to be used in the catalyst component solution. The preferred polyenes for use in this invention are 1,3-butadiene, 1,3-pentadiene, isoprene, and myrcene. The most preferred polyene is 1,3-butadiene.

Generally, the larger the ratio of the amount of polyene to the cobalt compound in the catalyst component solution, the higher the activity of the catalyst. However, the activity of the catalyst reaches a maximum value at a ratio by mole of polyene monomer to the cobalt compound used in the catalyst component solution of between 10 and 200. For example, if a molar ratio of polyene monomer to the cobalt compound of 10,000 is employed the activity of the catalyst will be similar to that of the catalyst prepared from a catalyst component solution containing a ratio of polyene monomer to the cobalt compound of from 10 to 200. If the ratio is less than 1.0, the resultant catalyst composition has poor activity.

The catalyst component solution is preferably prepared at a temperature of 10° to 50° C. and preferably contains 0.0005 to 1.0% by mole, more preferably 0.001 to 0.5% by mole, of the cobalt compound. 0.001 to 10% by mole, more preferably, 0.03 to 5% by mole of the organoaluminum compound based on the amount by mole of 1,3-butadiene to be polymerized. The ratio by mole of the organoaluminum compound to the cobalt compound is preferably in a range from 0.5 to 50, more preferably, from 0.2 to 10.

In the preparation of the catalyst component solution it is preferred for the cobalt compound to be first dissolved in the inert organic solvent in the presence of the polyene monomer and then for the organoaluminum compound to be added to the solution. However, very satisfactory results can also be obtained when the organoaluminum compound is added first.

In the preparation of this catalyst component solution the organoaluminum compound should not be allowed to come in contact with water. This is because water can completely decompose such organoaluminum compounds. Accordingly, it is preferable that the inert organic solvent to be used to prepare the catalyst component solution be preliminarily dehydrated at least up to a content of water which is insufficient to completely decompose the entire amount of the organoaluminum compound.

It is preferable that the catalyst component solution be prepared using a dehydrated inert organic solvent. However, a trace of water in the inert organic solvent can be present up to a concentration of about 500 ppm (parts per million by weight). In fact, it is believed that the total elimination of water from such a catalyst component solution is undesirable. It is preferred for no more than 200 ppm of water to be present in the inert organic solvent used in the preparation of the catalyst component solution. If the content of water in the inert organic solvent is larger than 500 ppm, the catalyst component solution has to contain a relatively large amount of the cobalt compound and organoaluminum compound. This results in an economic disadvantage. If a sufficient amount of water is present in the inert organic solvent used in the preparation of the catalyst component solution the catalyst can be completely destroyed.

It is desirable to allow the prereaction used in the preparation of the catalyst component solution to run for a period of at least 30 seconds, and more preferably for at least 1 minute before mixing the catalyst component solution with the 1,3-butadiene/water mixture to form the reaction mixture. Longer time periods can be used without the catalyst component solution losing its activity.

After the organoaluminum compound has been incorporated in the catalyst component solution using the above-described technique the catalyst is "protected" from decomposition by water. This is believed to be due to a microencapsulation of the catalyst by polyene product formed in the prereaction process used in the preparation of the catalyst component solution.

It is believed that a hydrophobic shield is formed around the catalyst that water cannot readily penetrate; however, this hydrophobic shield or membrane is probably permeable by the butadiene monomer being polymerized into the syndiotactic 1,2-polybutadiene. When 1,3-butadiene is used as the polyene, the butadiene product which microencapsulates the catalyst is believed to be a butadiene monomer complex, an oligomerized butadiene or a polymer of butadiene. It has been determined that this protection is sufficient to allow for the use of this catalyst component solution in an aqueous suspension polymerization of butadiene into 1,3-polybutadiene of syndiotactic crystallinity.

In the second step of this process a reaction mixture is prepared by mixing the catalyst component solution with a 1,3-butadiene/water mixture. This B 1,3-butadiene/water mixture can contain from as little as about 2% butadiene to as much as about 50% butadiene by weight. It is preferred for this 1,3-butadiene/water mixture to contain from 15% to 35% by weight butadiene and it is more preferred for it to contain about 20 to 25% butadiene by weight. Since 1,3-butadiene is very volatile it will be necessary to prepare this mixture in a closed system. Agitation should be provided in the preparation of the reaction mixture in order to insure that the catalyst component solution and 1,3-butadiene are distributed essentially homogeneously throughout the mixture. Since 1,3-butadiene is essentially insoluble in water it will be present in this mixture in the form of droplets which are distributed throughout the mixture. If agitation is discontinued there will be a separation of the organic and aqueous components of this mixture into two layers. The organic and aqueous layers of this reaction mixture can be mixed together again by agitating the reaction mixture.

In the third step of this process a polymerization mixture is prepared by mixing carbon disulfide throughout the above-described reaction mixture. The amount of carbon disulfide that can be added will vary between 0.005 mole percent and 2 mole percent based on the amount of moles of 1,3-butadiene to be polymerized in the polymerization mixture. More preferably the amount of carbon disulfide added will vary between 0.001 and 1 mole percent based on the amount of moles of 1,3-butadiene to be polymerized in the polymerization mixture.

In the process of the present invention, the larger the proportion of the carbon disulfide in a range from about 0.0005 to about 0.5% by mole based on the amount by mole of the 1,3-butadiene to be polymerized in the polymerization mixture, the larger the yield of the polymer product obtained from the polymerization mixture. However, too large an amount of carbon disulfide, for example, larger than 0.5% by mole, causes a decrease in the polymer yield.

In the process of the present invention the crystallinity and melting point of the polybutadiene produced can be controlled by adding alcohols, ketones, nitriles, aldehydes, or amides to the polymerization mixture. In this aqueous suspension polymerization process there is a limitation of controlling crystallinity and melting point with agents which are water-soluble. Thus ethanol and methanol are not as effective as other alcohols which are much less soluble in water than in hydrocarbons. Water soluble agents can not be used effectively to control crystallinity and melting point (only hydrocarbon soluble agents can be used). A detailed description of the agents and techniques that are used to control crystallinity and melting points is given in U.S. Pat. Nos. 3,901,868 and 4,153,767. These patents are incorporated herein by reference in their entirety. As has been pointed out, water soluble agents, such as ethanol and methanol, are not effective agents. Other alcohols such as, 2-ethyl-1-hexanol, 1-decanol, and 5-tridecanol, which are not soluble in water, have been used very successfully.

In the final step of this process the 1,3-butadiene monomer in the polymerization mixture is converted into polybutadiene while agitating the polymerization mixture. If the use of an antioxidant is desired, it may be added conveniently at the beginning of the polymerization. This polymerization of 1,3-butadiene monomer can be carried out at a temperature from about −20° C. to about 90° C. It is preferable for the polymerization temperature to be from 0° C. to 40° C. The most preferred polymerization temperature is about 10° C. At temperatures below 0° C. an antifreeze agent can be added to the polymerization mixture to keep it from freezing.

This polymerization can be carried out either under a normal pressure or in a pressurized system. This polymerization can be carried out under a nitrogen atmosphere with good results. Such a polymerization can be run for a period of from about 1 to about 30 hours. It is generally preferred for the polymerization to be run for about 10 hours. However, the optimum polymerization time will vary greatly with the polymerization temperature, catalyst, the amount of catalyst used, etc. The polybutadiene formed using the process of this invention will float to the surface of the polymerization mixture and can easily be recovered.

DESCRIPTION OF THE PREFERRED EMBODIMENTS

Various embodiments of the process of the present invention in practice are illustrated by the following working examples. These examples are intended merely to illustrate the present invention and not in any sense to limit the scope in which the present invention can be practiced. Unless specifically indicated otherwise, parts and percentages are given by weight.

EXAMPLE 1

A typical polymerization utilizing the process of this invention was carried out by preparing a 1.85M (molar) solution of butadiene in hexane under a nitrogen atmosphere. 22.5 ml (milliliters) of this solution was added to a 4 oz (118 ml) bottle. 5.53 ml of a 1.52M triethylaluminum in hexane solution was added to the bottle. 1.74 ml of a 0.96M solution of cobalt octoate in mineral spirits was then added. The bottle was then placed on a shaker for a period of about one hour at room temperature in order to form the catalyst component solution.

A reaction mixture was prepared by adding 0.58 ml of the aforementioned catalyst component solution to a 4 oz (118 ml) bottle containing 40 grams of deionized water and 20 grams of 1,3-butadiene monomer. The polymerization mixture was then prepared by adding 0.49 ml of a 0.10M solution of carbon disulfide in hexane to the aforementioned reaction mixture. The bottle was then placed in a constant temperature bath and tumbled at 10° C.

After the polymerization was run for a period of 22 hours the bottle was removed from the constant temperature bath. The polybutadiene that was obtained was then soaked in 300 ml of a 1 percent solution of 2,6-di-tert-butyl-p-cresol in methanol. The polybutadiene was washed two times with such a methanol solution and it was then filtered off and vacuum dried at 90° C. The yield of polymer was determined to be 38 percent. Using differential scanning calorimetry, the peak melting temperature was found to be 188° C.

EXAMPLE 2

The procedure specified in Example 1 was utilized in the synthesis of a polybutadiene except that 1.0 ml of 5-tridecanol was added to the reaction mixture after the triethylaluminum and cobalt octoate were added. The yield of polybutadiene was determined to be 63 percent and its melting point was 164° C. This shows that the addition of a water insoluble alcohol to the reaction mixture used in such a polymerization can reduce the melting point of the polybutadiene produced and increase the yield. The melting point of the polybutadiene produced in such a polymerization can be accurately controlled by adjusting the amount of alcohol present in the reaction mixture.

EXAMPLES 3 THROUGH 9

A catalyst component solution was prepared by adding 5.53 ml of a 1.52M triethylaluminum in hexane solution to 22.5 ml of a 1.85M butadiene in cyclohexane solution which was in a 118 ml bottle under nitrogen, followed by the addition of 0.80 ml of a 2.09M cobalt octoate in mineral spirits solution. This bottle was capped and placed on a shaker for about one hour.

A series of reaction mixtures were prepared by adding various amounts of the aforementioned catalyst component solution to a series of 118 ml bottles containing 40 g of deionized water and 20 gram of 1,3-butadiene monomer. The amount of catalyst component solution added is shown in Table I. Various amounts (shown in Table I) of a 0.1M carbon disulfide in cyclohexane solution were then added to the series of bottles to form polymerization mixtures.

The bottles were placed in a constant temperature bath at 10° C. and tumbled for 20 hours. The polymers obtained were washed in a 1% solution of 2,6-ditertiarybutyl-p-cresol in methanol and dried in a 65° C. forced air oven for 10 hours. Polymer yields were determined and are shown in Table I. The peak melting temperature in Examples 3,4 and 6 was determined to be 199° C. and was determined to be 200° C. in Example 5.

TABLE I

| Example | Catalyst Component Solution Added (ml) | CS$_2$ Solution Added (ml) | Polymer Yield |
| --- | --- | --- | --- |
| 3 | 0.56 | 0.49 | 46% |
| 4 | 0.84 | 0.74 | 76% |
| 5 | 1.12 | 0.98 | 96% |
| 6 | 1.40 | 1.22 | 100% |
| 7 | 1.68 | 1.47 | 100% |
| 8 | 1.96 | 1.72 | 100% |
| 9 | 2.24 | 1.96 | 100% |

EXAMPLES 10 THROUGH 12

The same procedure that was specified in Example 2 was employed except that various amounts of 1-butanol were used in these Examples in place of the 5-tridecanol and the polymerization time was 25 hours. The amount of 1-butanol used and the resulting polymer yields, and peak melting points as determined by differential scanning calorimetry are shown in Table II.

TABLE II

| 1-Butanol Added (ml) | Polymer Yield | Melting Temperature |
| --- | --- | --- |
| 1.0 | 63% | 177° C. |
| 4.0 | 75% | 140° C. |

TABLE II-continued

| 1-Butanol Added (ml) | Polymer Yield | Melting Temperature |
|---|---|---|
| 10.0 | 74% | 116° C. |

EXAMPLES 13 THROUGH 18

Six different polyenes were tested in a series of experiments to ascertain their usefulness in the preparation of catalyst component solutions. 50 ml of a polyene in toluene solution of one of the polyenes listed in Table III was added to a series of 118 ml bottles under nitrogen. 1.6 ml of a 2M solution of cobalt octoate in mineral spirits and 9.0 ml of a 1.52M solution of triethylaluminum in hexane were added to the bottles to produce a series of catalyst component solutions.

1.5 ml of these catalyst component solutions were added to a series of 118 ml bottles containing 50 g of deionized water and 25 g of 1,3-butadiene. 0.6 ml of a 0.2M solution of a carbon disulfide in hexane was then added to the bottles to produce a series of polymerization mixtures. 0.032 millimoles of cobalt octoate, 0.128 millimoles of triethylaluminum, and 0.032 millimoles of carbon disulfide per 100 g of 1,3-butadiene monomer were present in these polymerization mixtures.

This series of bottles was then placed in a constant temperature bath at 10° C. and tumbled for 20 hours. The contents of these bottles were then poured into a series of beakers containing 300 ml of methanol. The polymers produced were isolated by filtration, washed with water, and dried. The polyenes employed, the amount of the polyene employed, and the polymer yields are shown in Table III.

TABLE III

| Example | Polyene | Amount of Polyene* | Polymer Yield |
|---|---|---|---|
| 13 | Isoprene | 20 | 67 |
| 14 | Myrcene | 15 | 33 |
| 15 | trans-Piperylene | 10 | 76 |
| 16 | 1,5-Cyclooctadiene | 20 | 22 |
| 17 | 1-Pentene | 22 | 0 |
| 18 | Cyclooctene | 38 | 0 |

*in millimoles per 100 g of 1,3-butadiene

While certain representative embodiments and details have been shown for the purpose of illustrating the invention, it will be apparent to those skilled in this art that various changes and modifications can be made therein without departing from the scope of this invention.

What is claimed is:

1. An aqueous polymerization medium comprising a catalyst composition which contains (a) an organometallic compound selected from the group consisting of organoaluminum compounds of the formula $AlR_3$, organomagnesium compounds of the formula $MgR_2$, and organolithium compounds of the formula $LiR$, wherein R represents a hydrocarbon radical of 1 to 6 carbon atoms and (b) a cobalt compound selected from the group consisting of (i) β-diketone complexes of cobalt, (ii) β-keto acid ester complexes of cobalt, (iii) cobalt salts of organic carboxylic acids having 6 to 15 carbon atoms, and (iv) complexes of halogenated cobalt compounds of the formula $CoX_n$, wherein X represents a halogen atom and n represents 2 or 3, with an organic compound selected from the group consisting of tertiary amine alcohols, tertiary phosphines, ketones and N,N-dialkylamides; wherein said catalyst composition is microencapsulated in a polyene product; and wherein said catalyst composition is dispersed in water.

2. An aqueous polymerization medium comprising a catalyst composition which is prepared by dissolving in an inert organic solvent containing at least one polyene (a) cobalt compound selected from the group consisting of (i) β-diketone complexes of cobalt, (ii) β-keto acid ester complexes of cobalt, (iii) cobalt salts of organic carboxylic acids having 6 to 15 carbon atoms, and (iv) complexes of halogenated cobalt compounds of the formula $CoX_n$, wherein X represents a halogen atom and n represents 2 or 3, with an organic compound selected from the group consisting of tertiary amine alcohols, tertiary phosphines, ketones and N,N-dialkylamides; and (b) an organometallic compound selected from the group consisting of organoaluminum compounds of the formula $AlR_3$, organomagnesium compounds of the formula $MgR_2$, and organolithium compounds of the formula $LiR$, wherein R represents a hydrocarbon radical of 1 to 6 carbon atoms; and wherein said catalyst composition is dispersed in water.

3. An aqueous polymerization medium as specified in claim 1 wherein said polyene product is a product of at least one polyene selected from the group consisting of butadiene, 1,3-pentadiene, isoprene, and mycrene.

4. An aqueous polymerization medium as specified in claim 2 wherein said polyene is selected from the group consisting of butadiene, 1,3-pentadiene, isoprene, and mycrene.

5. An aqueous polymerization medium as specified in claim 1 wherein said polyene product is a product of a conjugated polyene.

6. An aqueous polymerization medium as specified in claim 2 wherein said polyene is a conjugated polyene.

7. An aqueous polymerization medium as specified in claim 1 said organometallic compound is an organoaluminum compound of the formula $AlR_3$ wherein R represents a hydrocarbon radical of 1 to 6 carbon atoms.

8. An aqueous polymerization medium as specified in claim 2 wherein said organometallic compound is an organoaluminum compound of the formula $AlR_3$ wherein R represents a hydrocarbon radical of 1 to 6 carbon atoms.

9. An aqueous polymerization medium as specified in claim 7 further comprising an unsaturated hydrocarbon monomer wherein said aqueous polymerization medium contains 0.0005 to 1.0 percent by mole of the cobalt compound and 0.001 to 10 percent by mole of the organometallic compound based on the amount by mole of monomer present.

10. An aqueous polymerization medium as specified in claim 8 further comprising an unsaturated hydrocarbon monomer wherein said aqueous polymerization medium contains 0.0005 to 1.0 percent by mole of the cobalt compound and 0.001 to 10 percent by mole of the organometallic compound based on the amount by mole of monomer present.

11. An aqueous polymerization medium as specified in claim 9 wherein said aqueous polymerization medium contains 0.001 to 0.5 percent by mole of the cobalt compound and 0.03 to 5 percent by mole of the organometallic compound based on the amount by mole of monomer present.

12. An aqueous polymerization medium as specified in claim 10 wherein said aqueous polymerization medium contains 0.001 to 0.5 percent by mole of the cobalt compound and 0.03 to 5 percent by mole of the organometallic compound based on the amount by mole of monomer present.

13. An aqueous polymerization medium as specified in claim 12 wherein said catalyst composition is prepared at a temperature of 10° C. to 50° C.

14. An aqueous polymerization medium as specified in claim 9 wherein said unsaturated hydrocarbon monomer is a conjugated diolefin monomer.

15. An aqueous polymerization medium as specified in claim 10 wherein said unsaturated hydrocarbon monomer is a conjugated diolefin monomer.

16. An aqueous polymerization medium as specified in claim 14 wherein said conjugated diolefin monomer is selected from the group consisting of isoprene, piperylene, and butadiene.

17. An aqueous polymerization medium as specified in claim 15 wherein said conjugated diolefin monomer is selected from the group consisting of isoprene, piperylene, and butadiene.

* * * * *